(12) United States Patent
Nesta et al.

(10) Patent No.: US 11,763,832 B2
(45) Date of Patent: Sep. 19, 2023

(54) AUDIO ENHANCEMENT THROUGH SUPERVISED LATENT VARIABLE REPRESENTATION OF TARGET SPEECH AND NOISE

(71) Applicants: Synaptics Incorporated, San Jose, CA (US); THE TRUSTEES OF INDIANA UNIVERSITY, Bloomington, IN (US)

(72) Inventors: Francesco Nesta, Aliso Viejo, CA (US); Minje Kim, Bloomington, IN (US); Sanna Wager, Bloomington, IN (US)

(73) Assignees: Synaptics Incorporated, San Jose, CA (US); The Trustees of Indiana University, Bloomington, IN (US)

( * ) Notice: Subject to any disclaimer, the term of this patent is extended or adjusted under 35 U.S.C. 154(b) by 225 days.

(21) Appl. No.: 16/865,111

(22) Filed: May 1, 2020

(65) Prior Publication Data

US 2020/0349965 A1 Nov. 5, 2020

Related U.S. Application Data

(60) Provisional application No. 62/841,762, filed on May 1, 2019.

(51) Int. Cl.
*G10L 21/00* (2013.01)
*G10L 15/16* (2006.01)
(Continued)

(52) U.S. Cl.
CPC ........... *G10L 21/0264* (2013.01); *G06N 3/08* (2013.01); *G10L 21/0216* (2013.01)

(58) Field of Classification Search
CPC .......... G10L 17/18; G10L 21/00; G10L 17/16
See application file for complete search history.

(56) References Cited

U.S. PATENT DOCUMENTS

2004/0024588 A1\* 2/2004 Watson ................ H04N 19/467
704/E19.009
2017/0092265 A1\* 3/2017 Sainath .................. G06N 3/084
(Continued)

OTHER PUBLICATIONS

Choi et al., "Phase-aware Single-stage Speech Denoising and Dereverberationwith U-net," arXiv preprint arXiv:2006.00687, Jun. 1, 2020.

(Continued)

*Primary Examiner* — Shreyans A Patel
(74) *Attorney, Agent, or Firm* — Paradice & Li LLP

(57) ABSTRACT

Systems and methods for generating an enhanced audio signal comprise a trained neural network configured to receive an input audio signal and generate an enhanced target signal, the trained neural network comprising a pre-processing neural network configured to receive a segment of the input audio signal and output an audio classification, the pre-processing neural network including at least one hidden layer comprising an embedding vector, and a noise reduction neural network configured to receive the segment of the input audio signal, and the embedding vector and generate the enhanced target signal. The pre-processing neural network may comprise a target signal pre-processing neural network configured to output a target signal classification and comprising at least one hidden layer comprising a target embedding vector. The pre-processing neural network may comprise a noise pre-processing neural network configured output a noise classification and comprising at least one hidden layer comprising a noise embedding vector.

18 Claims, 6 Drawing Sheets

(51) Int. Cl.
    *G10L 21/0264*     (2013.01)
    *G10L 21/0216*     (2013.01)
    *G06N 3/08*     (2023.01)

(56) References Cited

U.S. PATENT DOCUMENTS

| | | | | |
|---|---|---|---|---|
| 2018/0075859 | A1* | 3/2018 | Song | G10L 21/0264 |
| 2019/0043516 | A1* | 2/2019 | Germain | G10L 21/0208 |
| 2019/0122698 | A1* | 4/2019 | Iyer | H04N 21/4334 |
| 2019/0392852 | A1* | 12/2019 | Hijazi | H04N 21/2335 |

OTHER PUBLICATIONS

Ephraim et al., "Speech Enhancement Using aMinimum-Mean Square Error Short-Time Spectral Amplitude Estimator," IEEE Transactions on Acoustics Speech, and Signal Processing, vol. ASSP-32, No. 6, Dec. 1984.
Koyama et al., "Exploring the Best Loss Function for DNN-based Low-latencySpeech Enhancement with Temporal Convolutional Networks," arXiv preprint arXiv:2005.11611, Aug. 20, 2020.
Naderi et al., "A crowdsourcing extension of the itu-t recommendation p. 835 with validation," arXiv eprints,pp. arXiv-2010, 2020.
Naderi et al., "An Open Source implementation of ITU-T Recommendation p. 808 with Validation," arXiv:2005.08138v1, May 17, 2020.
Reddy et al., "ICASSP 2021 Deep Noise SuppressionChallenge," in ICASSP 2021—2021 IEEE InternationalConference on Acoustics, Speech and Signal Processing(ICASSP), 2021, pp. 6608-6612.
Avila et al., "Non-intrusive speech quality assessment using neural networks," in IEEE ICASSP, 2019.
Reddy et al., "The Interspeech 2020 deep noise suppression challenge: Datasets, subjective testing framework, and challenge results," in ISCA Interspeech, 2020.
Reddy et al., "Dnsmos p. 835: A non-intrusive perceptual objective speech quality metric to evaluate noise suppressors," arXiv preprint arXiv:2110.01763, 2021.
Jung et al., "Rawnet: Advanced end-to-end deep neural network using raw waveforms for text-independent speaker verification," arXiv preprint arXiv:1904.08104, 2019.
Wilkins et al., "Vocalset: A singing voice dataset.," in ISMIR, 2018.
Gemmeke et al., "Audio set: An ontology and human-labeled dataset for audio events," in IEEE ICASSP, 2017.
Thiemann et al., "The diverse environments multi-channel acoustic noise database (demand): A database of multichannel environmental noise recordings," The Journal of the Acoustical Society of America, p. 3591, May 2013.
Ko et al., "A study on data augmentation of reverberant speech for robust speech recognition," in IEEE ICASSP, 2017.
Reddy et al., "Interspeech 2021 Deep Noise Suppression Challenge," ISCA Interspeech, 2021.
Braun et al., "Data augmentation and loss normalization for deep noise suppression," in International Conference on Speech and Computer. Springer, 2020, pp. 79-86.
Jung et al., "Improved rawnet with feature map scaling for text-independent speaker verification using raw waveforms," arXiv preprint arXiv:2004.00526, 2020.
Wan et al., "Generalized end-to-end loss for speaker verification," in 2018 IEEE international Conference on Acoustics, Speech and Signal Processing (ICASSP). IEEE, 2018, pp. 4879-4883.
Snyder et al., "X-vectors: Robust dnn embeddings for speaker recognition," in 2018 IEEE International Conference on Acoustics, Speech and Signal Processing (ICASSP). IEEE, 2018, pp. 5329-5333.
Eskimez et al., "Personalized speech enhancement: New models and comprehensive evaluation," arXiv preprint arXiv:2110.09625, 2021.
Hansen et al., "Speaker recognition by machines and humans: A tutorial review," IEEE Signal processing magazine, vol. 32, No. 6, pp. 74-99, 2015.
"ITU-T recommendation p. 862: Perceptual evaluation of speech quality (PESQ): An objective method for end-to-end speech quality assessment of narrow-band telephone networks and speech codecs," Feb. 2001.
Beerends et al., "Perceptual objective listening quality assessment (POLQA), the third generation ITU-T standard for end-to-end speech quality measurement part II—perceptual model," AES: Journal of the Audio Engineering Society, vol. 61, pp. 385-402, Jun. 2013.
Fu et al., "SNR-Aware Convolutional Neural Network Modeling for Speech Enhancement," Interspeech, http://dx.doi.org/10.21437/Interspeech, pp. 3768-3772, Sep. 8-12, 2016.
Grais et al., "Single Channel Audio Source Separation Using Convolutional Denoising Autoencoders," IEEE GlobalSIP Symposium on Sparse Signal Processing and Deep Learning, 5th IEEE Global Conference on Signal and Information Processing (GlobalSIP 2017), Montreal, Canada Nov. 14-16, 2017.
Pascual et al., "SEGAN: Speech Enhancement Generative Adversarial Network," arXiv:1703.09452v3 [cs.LG] Jun. 9, 2017.
Dubey et al., "ICASSP 2022 Deep Noise Suppression Challenge," https://www.microsoft.com/en-us/research/academic-program/deep-noise-suppression-challenge-icassp-2022/.

* cited by examiner

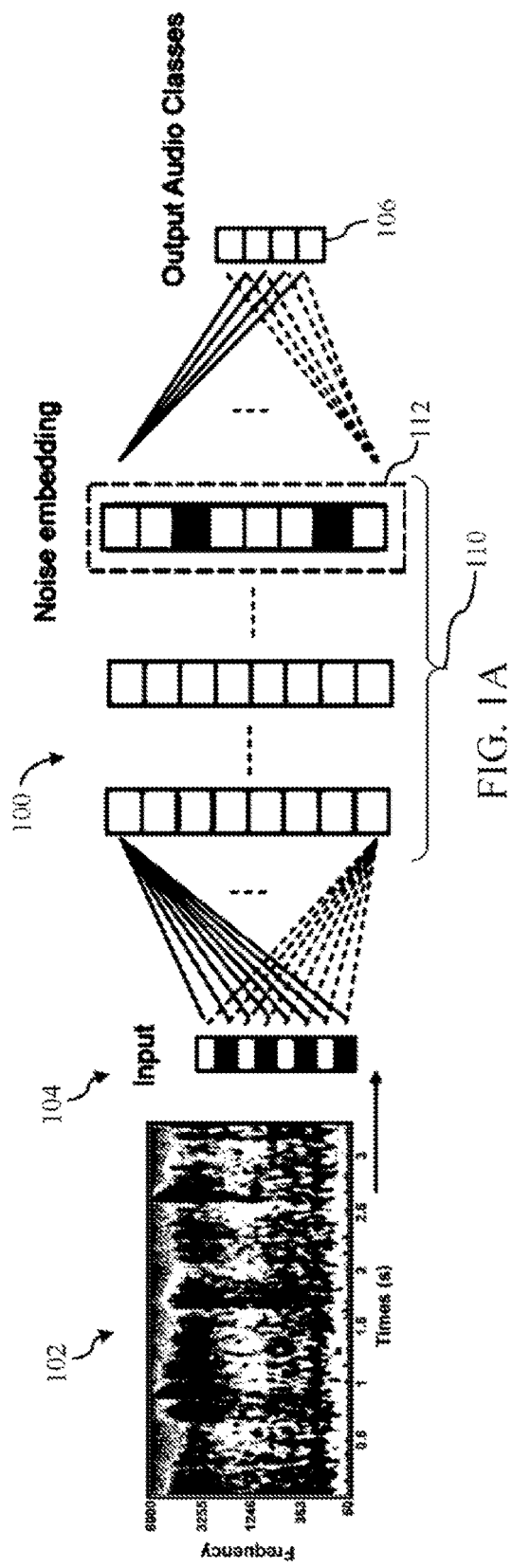
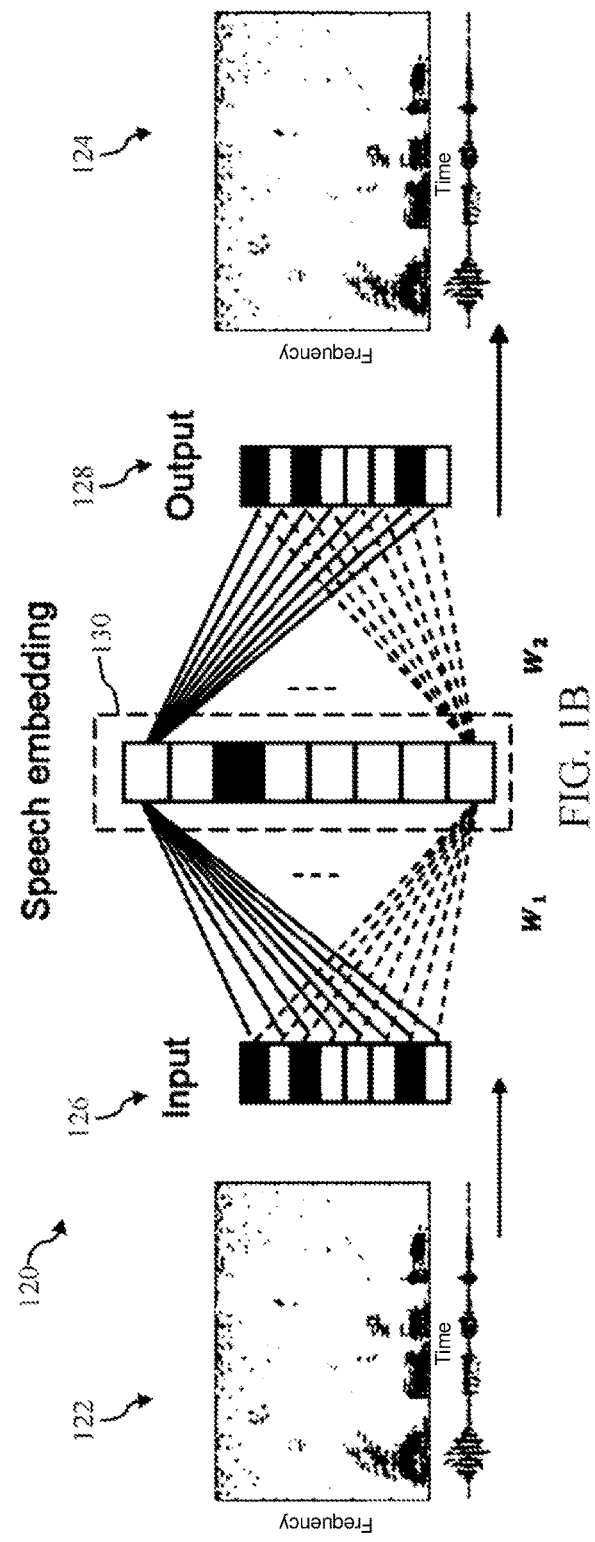
FIG. 1A
FIG. 1B

AUDIO ENHANCEMENT THROUGH SUPERVISED LATENT VARIABLE REPRESENTATION OF TARGET SPEECH AND NOISE

CROSS-REFERENCE TO RELATED APPLICATIONS

The present application claims the benefit of and priority to U.S. Provisional Patent Application No. 62/841,762 filed May 1, 2019, which is hereby incorporated by reference in its entirety.

TECHNICAL FIELD

The present application, in accordance with one or more embodiments, relates generally to systems and methods for audio signal processing and, more particularly, for example, to detecting, tracking and/or enhancing target audio signals corresponding to one or more acoustic sources.

BACKGROUND

Enhancement of audio signals is a task that has attracted the interest of audio researchers for many years. Recent developments in the subfield of speech denoising/enhancement have been used in a variety of audio input devices, such as smart phones and home assistants, that require noise-robust automatic speech recognition.

Various approaches exist for single- and multi-channel speech denoising, including systems and methods involving signal processing, machine-learning techniques such as non-negative factorization, independent component analysis, and deep learning. Deep learning systems, for example, include a deep-learning model for denoising that is trained on a dataset of audio mixtures of multiple speakers and different kinds of noise. For example, a trained deep learning model may be based on thousands of audio samples from a plurality of speakers under various noise conditions. From the error between separated speech and noise signals and the ground truth associated with the audio samples, the deep-learning model learns parameters that make the model achieve on average an improved quality over the mixed signal.

Conventional deep learning approaches for target speech enhancement have various drawbacks. Given that speakers and noise types vary greatly, processing every signal in the same manner may fail for a particular scenario. For example, one approach may train a multi-task learning model to estimate the signal-to-noise ratio (SNR) before separating the sources. Though an average improvement in segmental signal-to-noise ratio (SSNR) may be achieved, the signal quality may become worse than the original mixture's when the input signal has a SNR greater or equal to zero. Specifically, denoising may fail or output unsatisfactory results when the speech, noise, or mixture SNR in dB are different from the typical training examples. For example, a model trained on speech at multiple pitch levels may perform poorly with a particularly low voice. A set of models could be trained for various pitch ranges, but it can be difficult to account for all the different models that would be required, and their number would increase exponentially with the features.

In another approach, electroencephalographic (EEG) outputs have been used to inform the denoising algorithm for hearing aids. However, EEG data is not available in many systems. Other approaches train a deep neural network (DNN) for speech separation with target speaker information computed from an adaptation utterance—another utterance by the same speaker without any interfering noise or speech. The neural network structure in this approach has an inner layer factorized into several sub-layers. The output of the factorized layer is a combination of the sub-layers weighted by the output of an auxiliary input that processes the target speaker information. The auxiliary speaker information is a fixed-length embedding extracted from a separate DNN trained to classify frames of speech into a set of training speakers. In another approach, target speech is extracted from multi-speaker mixtures with prior information provided by an embedding vector of the target speaker. These approaches focus on providing prior information about the target speaker to improve results.

In view of the foregoing, there is a continued need in the art for improved detection, tracking, denoising and/or enhancement of target audio signals corresponding to one or more acoustic sources.

SUMMARY

The present disclosure provides systems and methods which improve denoising and target enhancement by providing prior information about both a target signal (e.g., target speech) and noise in the form of deep embeddings. In some embodiments, two embedding networks are trained to encode and disentangle specific characteristics of the noise and of the target speech, so that similar sounds within these categories have close embeddings.

Systems and methods for generating an enhanced audio signal comprise a trained neural network configured to receive an input audio signal and generate an enhanced target signal, the trained neural network comprising a pre-processing neural network configured to receive a segment of the input audio signal and output an audio classification, the pre-processing neural network including at least one hidden layer comprising an embedding vector, and a noise reduction neural network configured to receive the segment of the input audio signal, and the embedding vector and generate the enhanced target signal. The pre-processing neural network may comprise a target signal pre-processing neural network configured to output a target signal classification and comprising at least one hidden layer comprising a target embedding vector. The pre-processing neural network may comprise a noise pre-processing neural network configured output a noise classification and comprising at least one hidden layer comprising a noise embedding vector.

The scope of the present disclosure is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, where showings therein are for purposes of illustrating embodiments of the present disclosure and not for purposes of limiting the same. The components in the drawings are not necessarily to scale, emphasis instead being placed upon clearly illustrating the principles of the present disclosure.

FIGS. 1A, 1B and 1C illustrate a system structure of an embedding-supervised noise reduction (NR) system, in accordance with one or more embodiments of the present disclosure.

DETAILED DESCRIPTION

The present disclosure provides improved systems and methods for denoising and target signal enhancement. In various embodiments, prior information about both a target signal (e.g., target speech) and noise in the form of deep embeddings is provided. Two embedding networks are trained to encode and disentangle specific characteristics of the noise and the target signal so that similar sounds within these categories have close embeddings.

Figure 1C:
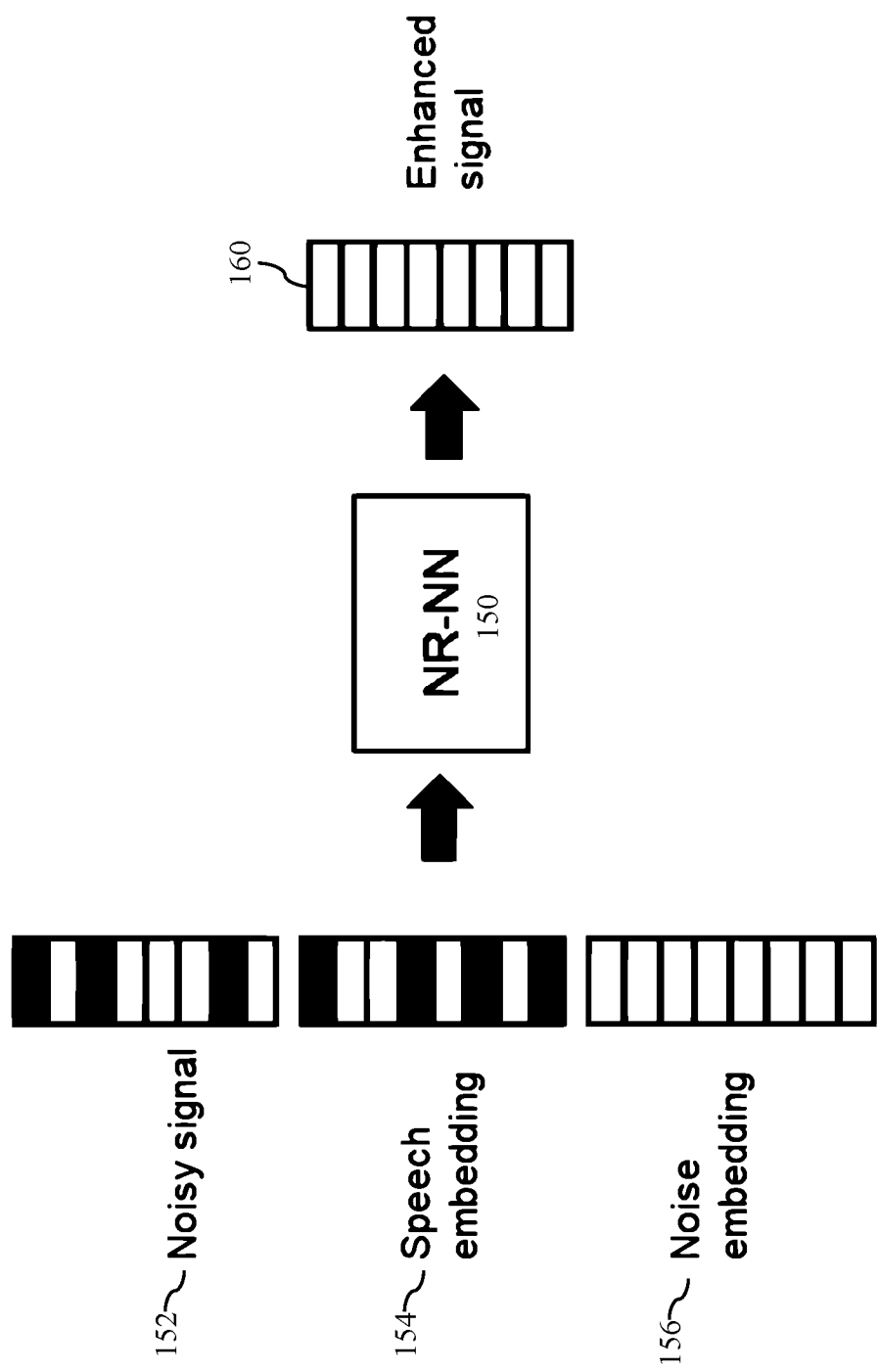

Referring to FIGS. 1A, 1B and 1C, an example system structure of an embedding-supervised denoising system will now be described. As illustrated in FIG. 1A, a deep neural network (DNN) 100 is trained for classifying audio sounds and includes an input layer 104 that receives audio samples 102, a plurality of hidden layers 110 and an output layer 106 that outputs corresponding audio classes. An activation vector 112 of the last hidden layer is used to describe a particular output noise classification.

FIG. 1B illustrates an autoencoder neural network 120 that is trained using clean speech samples 122 to extract a clean speech waveform 124. The autoencoder neural network 120 is a pre-processing neural network that includes an input layer 126, an output layer 128 and a plurality of hidden layers, including a speech embedding vector 130 in one of the hidden layers. In various embodiments, the autoencoder neural network 120 is trained to disentangle semantic categories, e.g., accents, genders, pitch, speech, etc., and, in the illustrated embodiment, the inner-most hidden layer is used for speech embedding.

Referring to FIG. 1C, a noise reduction neural network (NR-NN) 150 is trained with random speech and noise sequences to produce an enhanced signal 160. The inputs include the audio signal 152 (i.e., the noisy signal), the corresponding speech embedding 154 and the corresponding noise embedding 156 obtained through the pre-processing neural networks 120 and 100, respectively. At test time, the embeddings can be provided to the trained noise reduction neural network in different manners including unsupervised, semi-supervised, and user-guided approaches.

In an unsupervised approach, when the noise or the speech is in isolation, the embedding is computed through the respective supervising embedding DNNs (e.g., through an embedding vector extracted from the DNN) and an aggregated average embedding (e.g., aggregate average embedding vector) is computed. Similarly, the speech embedding is estimated when the speech is in isolation or when a high SNR is detected with the respect to the noise. In some embodiments, this method includes an auxiliary block configured to detect the signal parts with speech and noise in isolation and forward the corresponding audio samples to the appropriate supervising embedding DNN.

In a semi-supervised approach, metadata is used to retrieve a predefined embedding from a collection of embeddings describing known categories. The metadata may include any information identifying the nature of the audio signals. For example, an audio enhancement system could be used to enhance the speech in a movie or TV show. Using metadata from the show, embedding describing the expected audio is retrieved from an archive, e.g. for classes like movie genres, languages, etc. The noise embedding could be identified from the metadata in a similar manner. In some embodiments, the semi-supervised approach may allow for user adjustments. For the noise description, for example, the noise embedding can be visualized in a map and the user could fine-tune the speech enhancement quality by moving the selected embedding in the visualized space.

In a user-guided approach, a user interface is provided allowing the user to modify certain variables of the embedding which are directly linked to some high-level speech characteristics. At the same time, some prior embeddings for typical noise context can also be retrieved by inputting an audio example and by exploring the embedding space map in hierarchal manner.

A person having ordinary skill in the art will recognize the advantages of the systems and methods disclosed herein. An improved architecture is disclosed for denoising that includes incorporation of fixed-sized embeddings that are used as prior knowledge for the separation process. The architecture includes pre-processing networks that convert information about the target (e.g., speech) and noise characteristics provided by the user into the embeddings. The embeddings and the noisy input signal are provided to a denoising neural network which is trained to estimate the clean speech signal from these inputs. At test time, the noisy input signal is provided to the network together with the embeddings. In various embodiments, the embeddings may be determined in an unsupervised manner, through metadata associated with the noisy signal, or through user guidance.

Unsupervised Embedding Generation

Figure 2:
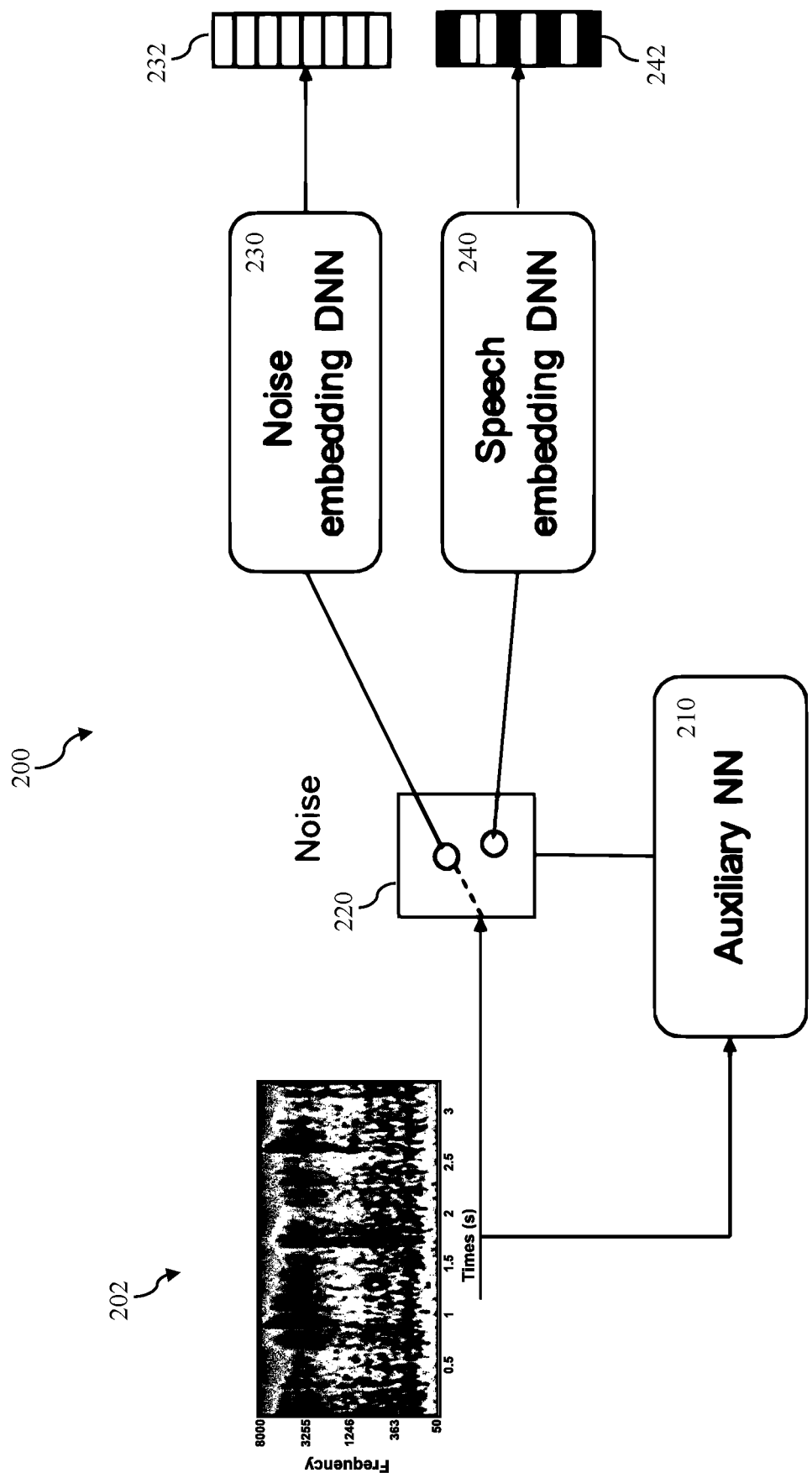
FIG. 2 illustrates a system for unsupervised embedding generation, in accordance with one or more embodiments of the present disclosure.

Referring to FIG. 2, an example unsupervised embedding generation system 200 will now be described in accordance with one or more embodiments. An auxiliary neural network (NN) 210 is trained to determine whether a segment of an input signal 202 can be classified as speech or noise. The auxiliary NN 210 could be a voice activity detector (VAD), for example, trained to detect noise or high-SNR speech time segments. Based on the classification, the audio frames routed by control block 220 to either the pre-processing noise embedding network 230 or to the pre-processing speech embedding network 240, respectively. The pre-processing noise embedding network 230 is trained to output a noise classification, and a corresponding noise embedding vector 232 is generated from a hidden layer (e.g., as described with reference to FIGS. 1A-C). The pre-processing speech embedding network 240 is trained to output a clean speech waveform, and a corresponding speech embedding vector 242 is generated from a hidden layer (e.g., as described with reference to FIGS. 1A-C).

Figure 3:
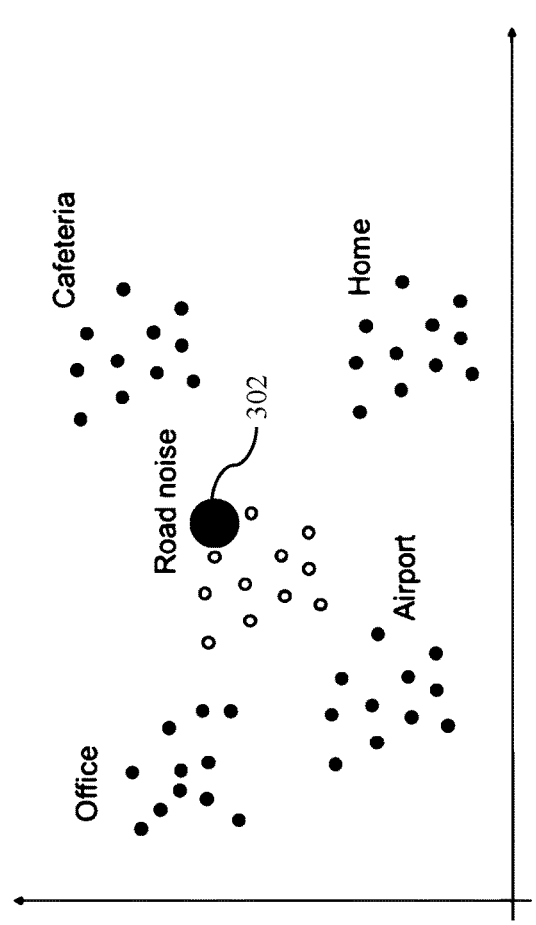
FIG. 3 illustrates an example representation of semantic classes in the embedded space, in accordance with one or more embodiments of the present disclosure.

FIG. 3 illustrates a representation of semantic classes in the embedded space, in accordance with an embodiment of the present disclosure. The large dot 302 is the average embedding estimated by the system by observing the noise-only audio data at test time. The estimated embeddings may be recursively averaged on-line with the incoming data for a cluster as illustrated. The estimated embeddings are then combined with the noisy input and forwarded to the denoising neural network.

Semi-Supervised Embeddings Generation Through Meta-Data

In another embodiment, an off-line procedure clusters for known categories which may be estimated by feeding related audio data to the pre-processing embedding networks. For example, a subset of audio noise in movies of different genres (e.g. action movies, documentaries, comedies, etc.) is sent to the pre-processing noise network and the average embedding is stored into the memory (see, e.g., FIG. 4). Similarly, embeddings related to different speech languages may be extracted by feeding different speech sentences to the pre-processing embedded network. At the test time, metadata may be extracted by a set-top-box media player, live streaming software, audio stream, website or similar playback source or device. The associated embeddings are retrieved from the memory and used to supervise the speech denoising network.

Figure 4:
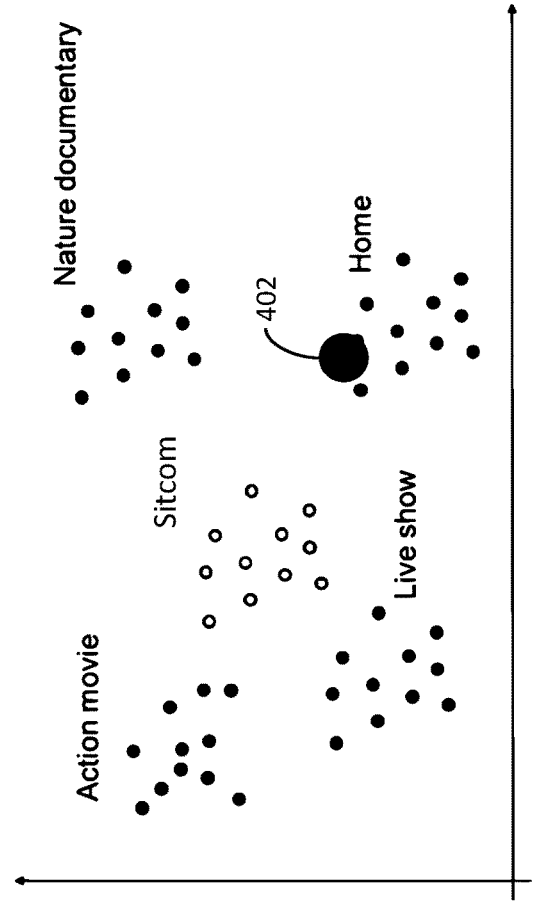
FIG. 4 illustrates an example representation of semantic classes in the embedded space for a metadata-based classification, in accordance with one or more embodiments of the present disclosure.

FIG. 4 illustrates a representation of semantic classes in the embedded space for the metadata-based classification, in accordance with an embodiment of the present disclosure. The large dot 402 is the embedding associated to the category specified in the metadata and fine-tuned by the user.

User-Guided Embedding Generation Through Interactive Fine Tuning

Figure 5:
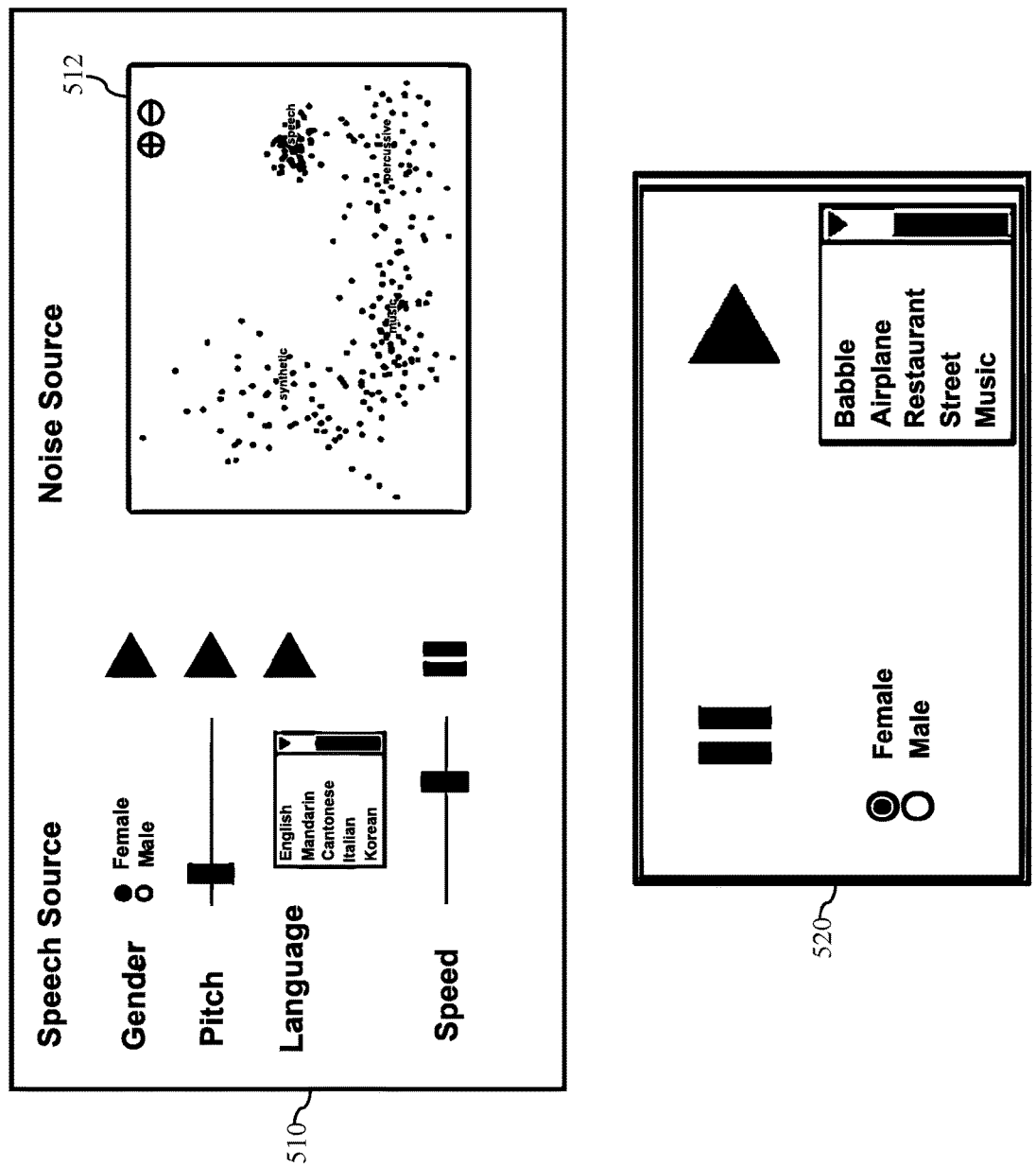
FIG. 5 illustrates example user-interfaces for fine tuning or manually selecting semantic embedding for user-guided audio enhancement, in accordance with one or more embodiments of the present disclosure.

In some embodiments, a user may have a recording of a mixed signal containing both speech and noise and may wish to remove the noise to extract a high-quality speech signal. The user may have listened to the mixed signal (or have other information about the audio content) and can make informed guesses about the characteristics of the unmixed signals. For example, as illustrated in FIG. 5 a user interface 510 may be provided allowing the user to input information on the source speaker. The user may know, for example, that the speaker is male, has a strong accent (e.g., Korean or English), has a medium pitched voice, and speaks fast. The user can then adjust sliders provided in the interface 510 for speed, gender, pitch, and other features of interest.

The user interfaces 510 and 520 illustrated in FIG. 5 allow for user selection of prior information for fine tuning or manually selecting some semantic embedding for user-guided audio enhancement. In addition to the description about the speaker, the user can also find a recording that sounds similar to the noise and input the raw audio to the system. Depending on the user's knowledge, these specifications can be close to the true signals. In the case of the noise being that of a dog barking, for example, a user who knows dog breeds can search for a recording using the specific breed as a keyword, while a less specialized user might simply find a recording of any dog and still provide useful prior knowledge to the model.

The example-driven prior information can be sometimes difficult to handle from the user's perspective due to the lack of an understandable interface. Another option is to build a hierarchical map (such as map interface 512) of noise types that allows the user to search for a sound that is similar to the one in the mixed recording. The hierarchical map can be built in a data-driven way, for example, by learning discriminant embeddings of the sound examples and by comparing them to build a semantic map of sound examples. A user could, for example, start with a category like "animal", then find "dog", and select lower branches of dog breeds by listening to sample recordings at each level.

Training of Pre-Processing Embedding Networks

The data pre-processing program takes as input the speaker feature settings provided by the user and the noise recording. It outputs a fixed-sized embedding for each of these that can be used in the denoising program along with the mixed signal. There are many ways to generate a speaker embedding based on these inputs. One example involves training a variational autoencoder that maps various speech characteristics to different values. Another involves using a recurrent neural network for embeddings. A correspondence can then be learned between the embeddings trained on speech and the sliders. The noise latent variables can be generated in a similar way, except that there is no need to learn a correspondence between the embeddings and sliders.

Denoising Network

In some embodiments, the denoising network is trained on examples of mixtures of signals generated by summing individual noise and speech signals with varying signal-to-noise ratios. The latent variable representations of the ground truth signals and input these to the network along with the mixed signals may also be generated. The denoising network could be based on a denoising autoencoder structure with a dense or convolutional network. The embeddings can be inputted to the denoising network by concatenating them with the audio input in the visible layer or by inserting them in a deeper layer. The latter would induce the network to correlate the embeddings with a higher level latent representation of the sound and would allow the structure of the neural network in the first layers to be more meaningful for the nature of the audio input signals.

Additional Embodiments

Other than targeting the speech enhancement task itself, the methods disclosed herein may also be used to selectively control an audio processing neural network, to produce a high-level modification of an audio stream. For example, a system may be designed to control the enhancement in order to selectively reduce the most impulsive noise sounds with a high dynamic variation. This could be achieved by computing embeddings for these types of sounds and train the denoising network to cancel the identified sounds while passing through other sounds unchanged. At test time, the user would have the control to fine-tune the embedding to produce the wanted effect in a similar fashion as sound equalization is traditionally done in multimedia systems.

Example Operating Environment

Figure 6:
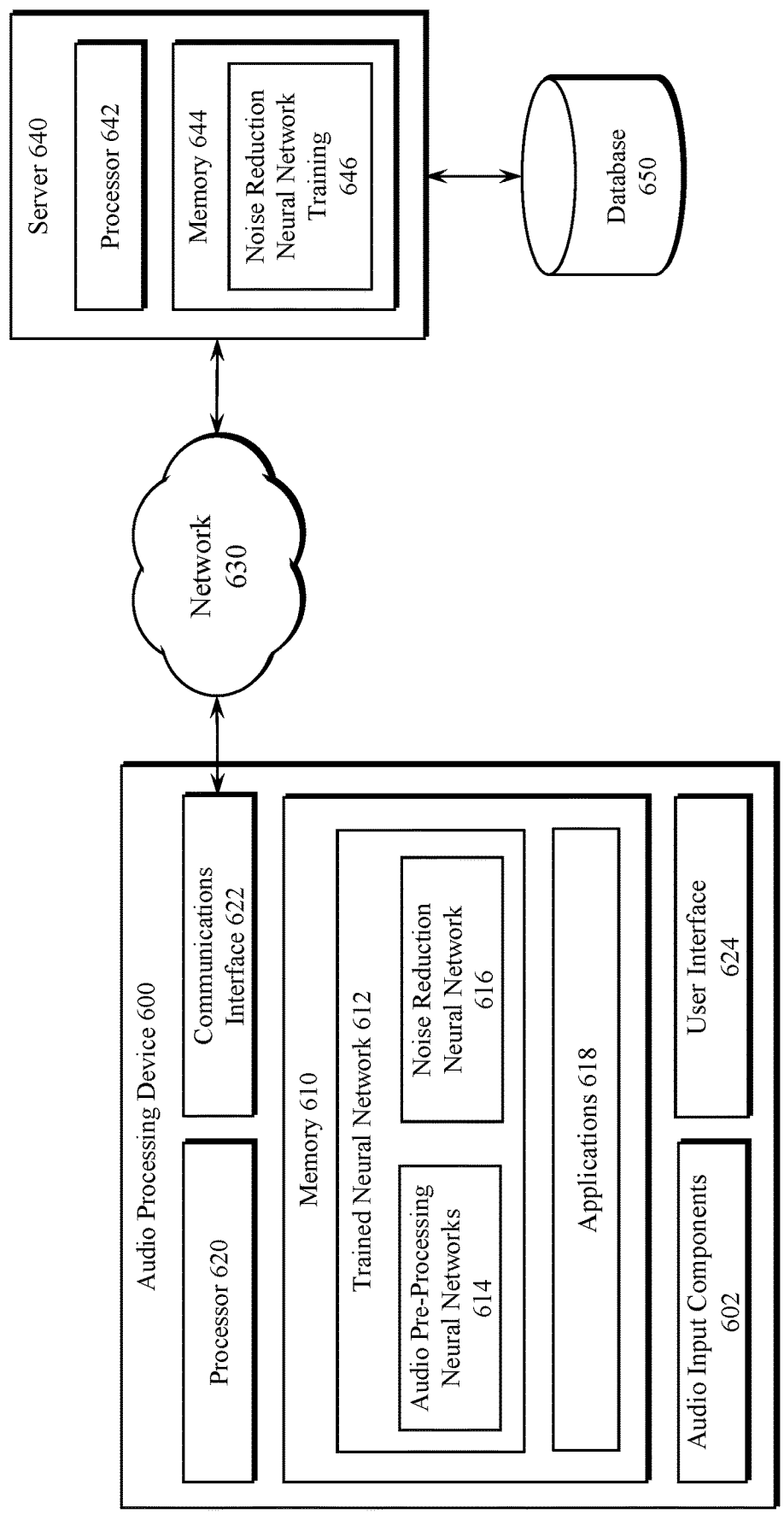
FIG. 6 illustrates an example audio processing device, in accordance with one or more embodiments of the present disclosure.

FIG. 6 illustrates an example audio processing device 600 providing audio signal enhancement, in accordance with one or more embodiments of the present disclosure. The audio processing device 600 includes audio input components 602, a memory 610, a processor 620, a communications interface 622 and a user interface 624. The audio processing device 600 may be implemented as any device that receives and processes audio data such as, for example, a mobile phone, smart speaker, tablet, laptop computer, desktop computer, voice-controlled appliance, set-top box or automobile. The audio processing device 600 may comprise other hardware and software components for operating the audio processing device 600 in various implementations.

The audio input components 602 are configured to sense, receive, generate and/or process an audio input signal for enhancement by the audio processing device 600. The audio input components may be implemented as an integrated circuit comprising analog circuitry, digital circuitry and/or a digital signal processor, which is configured to execute program instructions stored in memory. The audio input components 602 may include an audio sensor array comprising one or more microphones, anti-aliasing filters, analog-to-digital converter circuitry, echo cancellation circuitry, and other audio processing circuitry and components. The audio input components 602 may further be configured to perform echo cancellation, noise cancellation, target signal enhancement, post-filtering, and other audio signal processing. In some embodiments, the audio input component 602 includes an interface for receiving audio signal data from another device or network, such as an audio/video stream received at television set-top box.

The memory 610 may be implemented as one or more memory devices configured to store data and program instructions. Memory 610 may comprise one or more various types of memory devices including volatile and non-volatile memory devices, such as RAM (Random Access Memory), ROM (Read-Only Memory), EEPROM (Electrically-Erasable Read-Only Memory), flash memory, hard disk drive, and/or other types of memory.

The processor 620 may comprise one or more of a processor, a microprocessor, a single-core processor, a multi-core processor, a microcontroller, a logic device such as a programmable logic device (PLD) (e.g., field programmable gate array (FPGA)), a digital signal processing (DSP) device, or other logic device that may be configured, by hardwiring, executing software instructions, or a combination of both, to perform various operations discussed herein for embodiments of the disclosure.

The processor 620 is configured to execute software instructions stored in the memory 610, including logic for processing the audio input signal through a trained neural network 612, that includes audio pre-processing neural networks 614 and a noise reduction neural network 616 (e.g., as described in FIGS. 1A, 1B, 1C, 2 and/or 3). The processor 620 is further configured to control various operations of the audio processing device 600, including executing one or more applications 618. In various embodiments, the applications 618 may include a speech recognition engine configured to process the enhanced audio signal generated by the trained neural network 612, a voice command processor, voice communications applications configured to facilitate voice communications with one or more external devices, such as through a voice call over a mobile or cellular telephone network or a Voice over IP (VoIP) call over an internet protocol (IP) network, a user interface for controlling a set-top box, or other applications.

The user interface 624 may include a display, a touchpad display, a keypad, one or more buttons and/or other input/output components configured to enable a user to directly interact with the audio processing device 600. In some embodiments, the user interface 624 is configured to implement one or more of the user interface features disclosed in FIG. 5 and/or facilitate other user interactions disclosed herein.

The communications interface 622 facilitates communication between the audio processing device 600 and external devices. For example, the communications interface 622 may enable Wi-Fi (e.g., 802.11) or Bluetooth connections between the audio processing device 600 and one or more local devices, such as a mobile device or a wired or wireless router providing network access to a remote server 640, such as through communications network 630 (e.g., the Internet, the cloud, a cellular network, a local wireless network, etc.). In various embodiments, the communications interface 622 may include other wired and wireless communications components facilitating direct or indirect communications between the audio processing device 600 and one or more other devices. The communications network 630 may include one or more local networks such as a wireless local area network (WLAN), wide area networks such as the Internet, and other wired or wireless communications paths suitable for facilitating communications between components as described herein.

The server 640 may be configured to implement various processing operations disclosed herein. The server 640 may be implemented on one or more servers such as an application server that performs data processing and/or other software operations for processing audio signals. In some embodiments, the components of the audio processing device 600 and server 640 may be distributed across a communications network, such as the communications network 630. The server 640 includes communications components configured to facilitate communications with one or more audio processing devices over the communications network 630.

As illustrated, the server 640 includes one or more processors 642 that perform data processing and/or other software operations, including software instructions stored in memory 644. In one embodiment, a noise reduction and neural network training module 646 stores instructions and data for processing by the processor 642 to train a neural network for target signal enhancement using an audio training dataset stored in the database 650. The trained neural network may be stored on the audio processing device 600 (e.g., trained neural network 612) for execution thereon and/or stored on the server 640.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

The invention claimed is:

1. A system comprising:
 a trained neural network configured to receive an input audio signal and generate an enhanced target signal, the trained neural network comprising:
  a pre-processing neural network configured to receive a segment of the input audio signal, including metadata associated with the segment of the input audio signal, and generate an audio classification at an output layer, the pre-processing neural network including at least one hidden layer comprising an embedding vector generated based at least in part on the metadata associated with the segment of the input audio signal; and
  a trained noise reduction neural network configured to receive the segment of the input audio signal and the embedding vector as inputs, and to generate the enhanced target signal based on the recevied segment of the input audio signal and the embedding vector.

2. The system of claim 1, wherein the pre-processing neural network comprises a target signal pre-processing neural network configured to receive the segment of the input audio signal and generate a target signal classification at the output layer; wherein the at least one hidden layer comprises a target embedding vector.

3. The system of claim 2, wherein the target signal pre-processing neural network further comprises a neural network trained to classify speech; and
 wherein the trained noise reduction neural network is configured to extract a speech waveform from the segment of the input audio signal.

4. The system of claim 2, wherein the target signal pre-processing neural network comprises an autoencoder neural network trained to classify a plurality of semantic categories.

5. The system of claim 1, wherein the pre-processing neural network comprises a noise preprocessing neural network configured to receive the segment of the input audio signal and generate a noise classification at the output layer; wherein the at least one hidden layer comprises a noise embedding vector.

6. The system of claim 5, wherein the noise pre-processing neural network further comprises a neural network trained to classify audio sounds and wherein the noise embedding vector comprises information describing a corresponding noise classification.

7. The system of claim 1, wherein the trained noise reduction neural network is trained with random speech and noise sequences and a corresponding embedding vector.

8. The system of claim 1, wherein the pre-processing neural network further comprises:
 a speech signal pre-processing neural network configured to receive the segment of the input audio signal and generate a speech signal classification at an output layer of the speech signal pre-processing neural network, the speech signal pre-processing neural network including a speech signal preprocessing neural network hidden layer comprising a speech embedding vector; and
 a noise pre-processing neural network configured to receive the segment of the input audio signal and generate a noise classification at an output layer of the noise pre-processing neural network, the noise pre-processing neural network including a noise pre-processing neural network hidden layer comprising a noise embedding vector; and
 wherein the system further comprises an auxiliary neural network configured to classify the segment of the audio input signal as speech or noise, and wherein the segment is processed by a corresponding pre-processing neural network.

9. The system of claim 8, wherein an average embedding vector is calculated for each pre-processing neural network.

10. The system of claim 1, wherein the embedding vector is a predefined embedding vector corresponding to a predetermined audio classification associated with the segment of the input audio signal.

11. The system of claim 10, wherein the predefined embedding vector is selected by a user.

12. A method comprising:
 receiving an audio signal, including metadata associated with the audio signal;
 generating an embedding vector associated with a segment of the audio signal, the embedding vector generated based at least in part on the metadata associated with the audio signal, the embedding vector corresponding to a hidden layer of a pre-processing neural network configured to classify the segment of the audio signal; and
 generating an enhanced audio signal using a trained noise reduction neural network configured to receive the segment of the audio signal and the embedding vector as inputs.

13. The method of claim 12, wherein generating the embedding vector further comprises:
 providing a speech pre-processing neural network configured to generate a target speech classification at an output layer, the speech pre-processing neural network comprising the hidden layer;
 processing the segment of the audio signal through the speech pre-processing neural network; and
 constructing the embedding vector from the hidden layer.

14. The method of claim 12, wherein the generating the embedding vector further comprises:
 providing a noise pre-processing neural network configured to generate a noise classification at an output layer of the noise pre-processing neural network, the noise preprocessing neural network comprising a first hidden layer;
 processing the segment of the audio signal through the noise pre-processing neural network; and
 constructing the embedding vector from the first hidden layer.

15. The method of claim 14, further comprising:
 providing a speech pre-processing neural network configured to generate a target speech classification at an output layer of the speech pre-processing neural network, the speech pre-processing neural network comprising a second hidden layer;
 processing the segment of the audio signal through the speech pre-processing neural network; and
 constructing a second embedding vector from the second hidden layer;
 wherein the second embedding vector is provided as an input to the trained noise reduction neural network.

16. The method of claim 15, wherein constructing the second embedding vector comprises calculating an average embedding vector for at least one target speech classification.

17. The method of claim 15, wherein constructing the embedding vector comprises calculating an average embedding vector for at least one noise classification.

18. The method of claim 12, further comprising receiving a user designation of at least one audio signal property, and wherein the embedded vector is generated in accordance with the user designation.

\* \* \* \* \*

UNITED STATES PATENT AND TRADEMARK OFFICE
CERTIFICATE OF CORRECTION

| | |
|---|---|
| PATENT NO. | : 11,763,832 B2 |
| APPLICATION NO. | : 16/865111 |
| DATED | : September 19, 2023 |
| INVENTOR(S) | : Nesta et al. |

It is certified that error appears in the above-identified patent and that said Letters Patent is hereby corrected as shown below:

In the Claims

In Column 9, Line 18, Claim 1, delete "enhanced target signal based on the recevied segment" and insert -- enhanced target signal based on the received segment --

Signed and Sealed this
Seventeenth Day of October, 2023

Katherine Kelly Vidal
*Director of the United States Patent and Trademark Office*